United States Patent
Parker

[11] 3,895,273
[45] July 15, 1975

[54] DIRECT CURRENT ENERGIZED SYNCHRONOUS MOTOR SYSTEM

[76] Inventor: Louis W. Parker, 2408 Sunrise Key Blvd., Ft. Lauderdale, Fla. 33304

[22] Filed: Mar. 6, 1974

[21] Appl. No.: 448,777

Related U.S. Application Data

[63] Continuation of Ser. No. 365,944, June 1, 1973, abandoned.

[52] U.S. Cl. ............ 318/138; 318/171; 318/227; 318/254; 310/229; 310/230
[51] Int. Cl.² .................................. H02K 29/00
[58] Field of Search .......... 318/138, 171, 227, 230, 318/231, 254; 310/225, 229, 230, 268

[56] References Cited
UNITED STATES PATENTS

| | | |
|---|---|---|
| 3,200,315 | 8/1965 | Thompson ..................... 318/138 |
| 3,290,573 | 12/1966 | Kamens .......................... 318/171 |
| 3,384,804 | 5/1968 | Salihi ............................ 318/138 X |
| 3,402,333 | 9/1968 | Hayner et al. ................ 318/138 |
| 3,423,662 | 1/1969 | Schlabach et al. .......... 318/138 X |
| 3,753,060 | 8/1973 | Greenwell .................... 318/227 |

*Primary Examiner*—G. Z. Rubinson
*Attorney, Agent, or Firm*—Elliott I. Pollock

[57] ABSTRACT

A synchronous motor system comprises an axial airgap motor employing a pair of wound end rotors having at least one stator therebetween. The stator comprises a plurality of separate windings of different phases each of which is connected to a direct current power source through an inverter comprising a plurality of selectively energizable silicon controlled rectifiers connected to the plurality of different phase windings respectively. Cyclically operable means are provided for activating different ones of the rectifiers in sequence to effect current flow from the direct current source through different ones of the stator windings in sequence. The stator defines a plurality of poles for each phase, and each pole takes the form of a plurality of adjacent stator segments which carry a given phase winding thereon and which also carry the windings of the other phases thereon, in asymmetrical relation to one another. When current is flowing through a winding of given phase via a given activated rectifier in the inverter, subsequent activation of a different one of the rectifiers produces a current flow through the winding of a different phase to produce an effective rotation of the stator field; and, due to the asymmetrical winding relationship employed, when current flows in said different phase, the current flow in turn induces a potential in the winding of the given phase which has a magnitude and polarity operative to turn off a conducting silicon controlled rectifier connected to the winding of said given phase. The rotor of the motor is energized by direct current and preferably employs a number of rotor pole segments equal to the number of stator pole segments to effectively increase the average torque of the motor.

23 Claims, 6 Drawing Figures

DIRECT CURRENT ENERGIZED SYNCHRONOUS MOTOR SYSTEM

CROSS REFERENCE TO RELATED APPLICATION

This application is a continuation in part of my prior copending application Ser. No. 365,944 filed June 1, 1973, for "Direct Current Energized Synchronous Motor System", now abandoned.

BACKGROUND OF THE INVENTION

The present invention relates to an electric motor adapted to be energized from a direct current source through an inverter of the silicon controlled rectifier type, and is more particularly concerned with a motor system of this general form wherein the characteristics of the motor and inverter are closely related to one another to provide a driving source, capable of use for example in motor vehicles, having a rugged configuration, an increased power to weight ratio, a considerable increase in efficiency of operation, and a much better average torque than has been available heretofore in conventional type constructions. Unlike conventional direct current motors, the commutator and brushes of the system of the present invention carry only very low current which is used for controlling the silicon controlled rectifiers.

An inverter of the general type employed in the present invention is described in the prior copending U.S. patent application of Joseph Jamieson Ser. No. 325,785 filed Jan. 22, 1973, for "Silicon Controlled Rectifier Type Inverter for Electric Motors", now U.S. Pat. No. 3,848,166 issued Nov. 12, 1974, and assigned to the instant applicant. The Jamieson inverter employs a network of silicon controlled rectifiers which are selectively energized in pairs to control the occurrence and direction of current flow through a motor coil winding, and the Jamieson inverter is further provided with a turn-off capacitor which is adapted to be charged to a predetermined polarity and thereafter connected across a selected conductive silicon controlled rectifier to turn off the rectifier. The present invention, as will appear hereinafter, employs a different turn-off mechanism which facilitates the shutting off of current through a conducting silicon controlled rectifier in the inverter so that, after the motor associated with the inverter has been started, the capacitor-type turn-off mechanism of the Jamieson inverter can be completely disabled without affecting the operation of the overall system.

The system of the present invention is applicable to any type of synchronous motor having three phases but has been found to exhibit numerous advantages when employed with axial airgap motors of the general type described in my prior U.S. Pat. No. 3,567,978, the disclosure of which is incorporated herein by reference. The form of motor employed in the present invention utilizes a plurality of stator windings of different phases which are individually associated with inverters of the Jamieson type; but a particular asymmetrical winding array is employed which causes current flowing in a winding of given phase to induce a potential in a winding of a different phase operative to turn off the silicon controlled rectifiers of the inverter associated with that different phase. The shut-off of the SCR's in the various inverters accordingly takes place automatically at exact points in time between the shutting off of one phase and the turning on of the next so that the DC current feeding the motor through the various inverters is practically constant. Much greater accuracy of turn-off is, accordingly, achieved than was possible in the Jamieson inverter.

The motor employed in the present invention is, moreover, characterized by a larger number of poles than usually employed, and by a stator wherein each pole of each phase is subdivided into a number of stator segments of lesser size. The resultant increase in the number of pole segments improves the torque to weight ratio of the motor, and the larger number of poles also permits the length of the motor to be shorter than has been possible in the past. The rotor of the motor is also preferably provided with a plurality of rotor pole segments equal in number to the stator segments, to increase the tangential to axial force in the axial airgap motor (or the tangential to radial force if a conventional motor is employed). The average torque of the motor is substantially increased by these techniques.

SUMMARY OF THE INVENTION

The synchronous motor system of the present invention comprises a motor, preferably of the axial airgap type, associated with a silicon controlled rectifier type of inverter, generally of the type described in the aforementioned Jamieson patent. The motor and inverter are modified however, so as to cooperate with one another in a unique manner, i.e., the motor includes a stator comprising a plurality of different phase windings which are individually associated with a number of different inverters of the general type described in the Jamieson application whereby the inverter network is operative to energize each of the different phase windings in a predetermined sequence; and the inverter itself is so modified as to make provision for interrupting the current flow through at least one of the stator windings at a predetermined time during the starting of the motor, and for thereafter using the counterelectromotive force or potential induced in an energized one of the windings, when the next successive phase winding is energized, to turn off the silicon controlled rectifiers associated with said one of said windings.

The principles of the present invention can be employed when the motor is entirely conventional in configuration. The motor is, however, preferably of the axial airgap type, e.g., of the type described by my prior U.S. Pat. No. 2,479,589, No. 3,277,323, No. 3,296,475, and No. 3,413,503. In the best form of the invention, the motor is of the axial airgap type described in my prior U.S. Pat. No. 3,567,978 wherein the motor is provided with a pair of end rotors and at least one stator disposed between the end rotors. The disclosure of my U.S. Pat. No. 3,567,978 is incorporated herein by reference, and describes a number of structural considerations which produce major reductions in the iron losses in the motor. This reduction in iron losses is of major importance in the system of the present invention, since the self-generated frequency applied to the stator may be several times the usual commercial frequency and would result in excessive iron losses and heating in motors of conventional design. These principles are used to even greater advantage in the present invention by modifying the stator and rotor pole structures, i.e., each stator pole is subdivided into a number of stator segments each of which extends over only a fraction of the stator pole arc, and the rotor poles are similarly subdivided into a plurality of segments equal in number to the number of stator pole segments.

Having equal number of segments on both rotor and stator produces a considerable variation in torque; however the system exhibits better average torque than conventional type constructions, and finds particular utility as a driving source in an electric motor vehicle. In order to reduce torque variations as the rotor segments pass each stator segment, two motors of the general type described could be provided on the same shaft with proper angular displacement between the poles of the two motors.

The rotor and stator of the motor are each of a wound configuration. The rotor windings are energized by a direct current. The stator windings are subdivided into a number of separate windings of different phase, and the different phase windings are energized in sequence to produce a rotating magnetic field which in turn effects rotation of the DC energized rotor. The sequential energization of the various different phase windings in the stator is accomplished by a plurality of inverters, each of the general type described in the aforementioned Jamieson application, connected respectively to the various different phase windings in the stator. A commutator is employed to activate the silicon controlled rectifiers in different ones of the inverters in proper sequence to effect current flow through selected different ones of the stator windings, in proper direction, at proper times. This current flow is usually well below 1 ampere and causes no undue arcing on the commutator.

The different phase windings on the stator are disposed in asymmetrical relation to one another relative to the plurality of segments comprising a single pole for a given phase. The arrangement is such that, when a given phase winding is energized, subsequent energization of the next phase winding to achieve rotation of the stator magnetic field induces a potential in the previously energized winding which is of sufficient magnitude and proper polarity to turn off the silicon controlled rectifiers associated with the previously conducting winding. The motor accordingly exhibits the ability to shut off conducting SCR's automatically at an exact point in time, with the shut off occurring so accurately that there is no appreciable time between the shutting off of one phase and the turning on of the next. The turn-off mechanism of the present invention accordingly provides far greater accuracy than would be the case if the Jamieson (capacitor-type) turn-off were employed, and permits the Jamieson turn-off mechanism to be deactivated once the motor is started.

BRIEF DESCRIPTION OF THE DRAWINGS

The foregoing construction, operation, and advantages of the present invention will become more readily apparent from the subsequent description and accompanying drawings in which.

DESCRIPTION OF THE PREFERRED EMBODIMENT

As described previously, the present invention is concerned with an electric motor adapted to be energized from a direct current source through a silicon controlled rectifier type of inverter. The inverter and motor are designed to operate together, and each has properties which enhance the operation of the other. The motor will be referred to hereinafter as a "synchronous motor" since it is associated with an inverter circuit employing silicon controlled rectifiers (hereinafter referred to as SCR's) which operate to change DC power to AC of a varying frequency. The motor runs in synchrony with that frequency throughout the full range, starting at zero frequency, i.e., DC. The motor is, moreover, preferably of the axial airgap type described in my prior U.S. Pat. No. 3,567,978, employing windings on the stator and rotor to achieve the desired synchronous motor operation; but motors having other axial airgap types of configuration, as well as conventional synchronous motors, may be employed instead.

Figure 1:
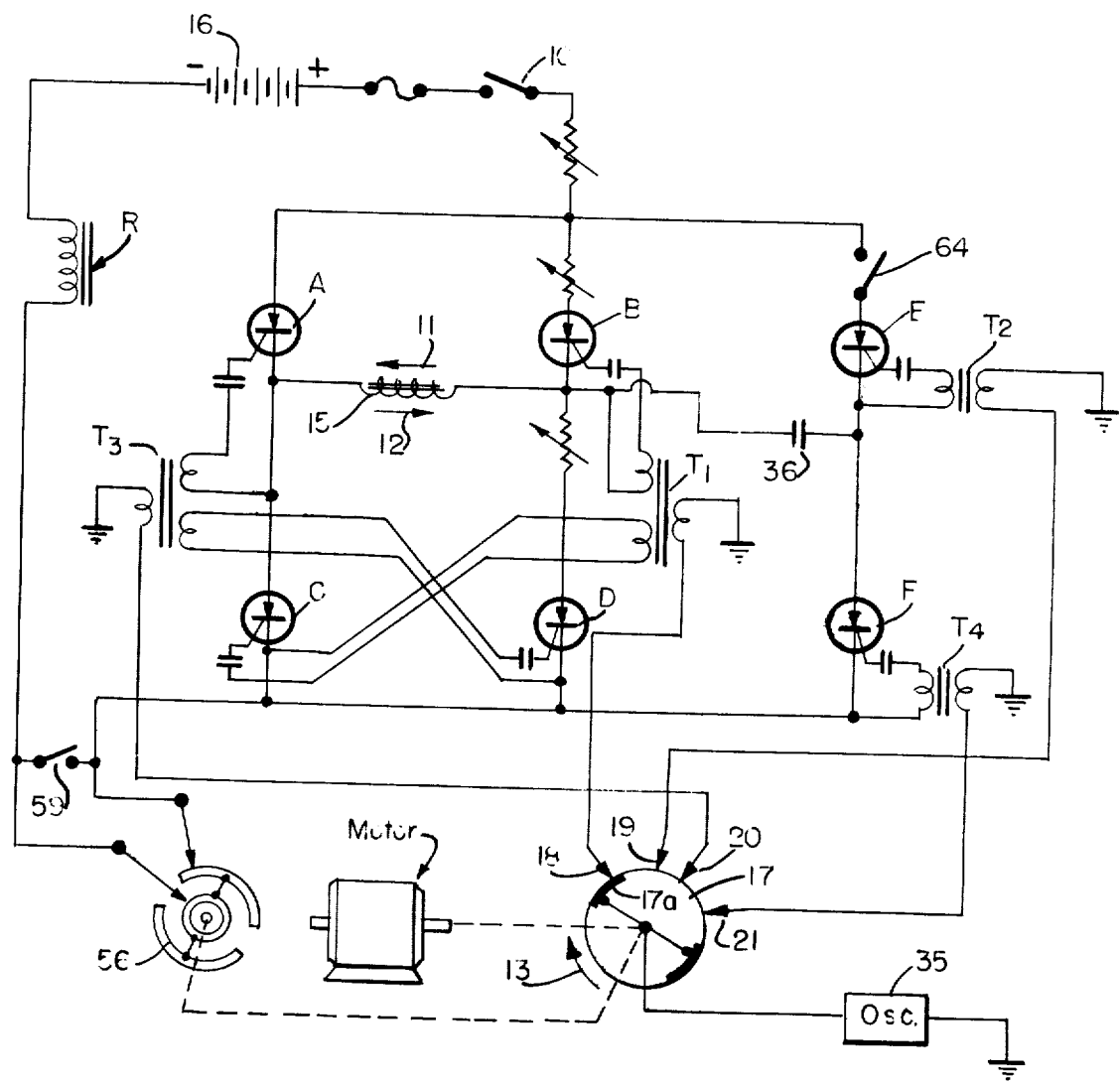
FIG. 1 is a schematic representation of a synchronous motor system, constructed in accordance with the present invention, showing the electrical circuit and accompanying mechanism employed for energizing a single phase winding in the stator of the motor.

As has been discussed earlier, and as will be discussed in greater detail hereinafter, the motor employs a stator which is provided with a number of separate phase windings adapted to be energized in sequence so as to produce a rotating stator field. FIG. 1 depicts the energization arrangement employed for one of the phase windings and it will be understood that a similar energization network will also be provided in association with each of the other phase windings respectively so that, in the complete system, the arrangement of FIG. 1 is repeated three or more times, except for the commutators 17 and 56 which are common to all of the inverters employed. The commutators are provided with brushes appropriately disposed thereon to activate each of the different inverters at proper times (in the case of commutator 17) or to interrupt current through different ones of the phase windings at proper times (in the case of commutator 56) as will be described hereinafter.

The inverter circuit shown in FIG. 1 corresponds to the inverter circuit of the aforementioned Jamieson patent, but is modified to include the aforementioned commutator 56, a switch 59 operative to selectively remove the commutator 56 from the circuit, and a switch 64 operative to selectively deactivate the Jamieson turn-off circuit. These aspects of the present invention will become more readily apparent subsequently.

Referring more particularly to FIGS. 1, coil 15 represents a load taking the form of a coil or set of coils comprising a portion of the motor depicted in FIG. 1. For purposes of the subsequent description, it is assumed that coil 15 is a stator coil constituting a single phase winding, that it is wound on an appropriate pole structure fabricated of magnetic material, that there is a corresponding rotor R adjacent thereto, and that the rotor R also carries a somewhat similar coil winding which has a direct current passing through it, e.g., from a DC source 16 such as the battery of a vehicle. It will be understood that if a direct current is passed through both the stator and rotor coils, there will be an attraction or repulsion between the two poles, and a torque will be delivered to the rotor shaft when the poles are in proper position relative to one another. In order that this torque may result in continuous rotation, it is necessary that the current through stator coil 15 be periodically reversed and that this reversal take place at an appropriate point in time when the stator and rotor are properly positioned relative to one another.

Current flow through stator coil 15, and the direction of said flow, is controlled by an inverter circuit comprising a plurality of SCR's A, B, C, and D connected to one another and to the opposing ends of coil 15 as illustrated, and adapted to cooperate with one another in pairs. More particularly, SCR's A and B have their cathodes connected to opposing ends of the coil 15, and have their anodes connected to one another and, via an on-off switch 10 and a fuse, to one side of battery 16. A further pair of SCR's C and D have their anodes connected to the opposing ends of coil 15, and have their cathodes connected together to the other side of source 16 (assuming, for the moment that switch 59 is closed). If SCR's B and C are rendered conductive, while SCR's A and D are nonconducting, current from battery 16 will pass through SCR's B and C to effect a current flow through coil 15 in the direction indicated by arrow 11. If SCR's B and C should now be shut off, and SCR's A and D rendered conductive, current will pass in the reverse direction through coil 15 as indicated by arrow 12. By continually reversing the pair of SCR's which is conductive, and by effecting these conductivity reversals at proper positions of the rotor, continuous rotation of the rotor will result.

The various SCR's are rendered conductive at proper times by a commutator 17 having a rotatable element comprising a pair of conductive segments 17a which are coupled to an oscillator 35, the said rotatable element being driven by the motor past a plurality of brushes 18–21. Let us assume that, at the start of the operation, switch 10 is closed, that all of SCR's A-D inclusive are nonconducting, and that a commutator segment 17a is approaching brush 18. When segment 17a engages brush 18, the alternating current output of oscillator 35 will be coupled to brush 18 and thence to the primary of a transformer $T_1$ to produce a signal in the secondary winding of said transformer which is coupled, via capacitors, to the control electrodes of rectifiers B and C. As a result, SCR's B and C will commence conduction, and a dc current will accordingly flow through coil 15 in the direction of arrow 11. This imparts a pull to the rotor R which begins to rotate. As the rotor and commutator continue to rotate, in the direction of arrow 13, segment 17a will break its connection with brush 18 and the control signal applied to the control electrodes of SCR's B and C will cease; but this will not change the operating condition of SCR's B and C, i.e., they will continue to conduct.

In order to reverse the direction of current flow through coil 15, it is necessary to turn off SCR's B and C and to turn on SCR's A and D. This turn off operation is achieved, in the aforementioned Jamieson circuit, by means of a capacitor 36 associated with a pair of further silicon controlled rectifiers E and F. More particularly, as commutator 17 continues to rotate segment 17a will engage brush 19 to apply a signal via transformer $T_2$ to the gating electrode of SCR-E; and SCR-E accordingly conducts and functions as a switching mechanism to shunt capacitor 36 across SCR-B. When this happens, capacitor 36 acts momentarily as a short circuit across SCR-B to render it nonconductive. Interruption of the current flow through SCR-B automatically breaks off the current flow through SCR-C as well. After a short period of time, the current flow from SCR-E through capacitor 36 will cause the capacitor to become charged, and as a result current flow through the capacitor will stop thereby breaking off further conductivity of SCR-E.

As the commutator 17 continues to rotate in the direction of arrow 13, it next engages brush 20 to couple a signal via transformer $T_3$ to the gating electrodes of SCR's A and D. Current now commences flowing through SCR's A and D via coil 15 and, at this time, passes through said coil in a direction 12 which is the reverse of the previous direction of current flow. Thereafter, as commutator 17 continues to rotate, it engages brush 21 to apply a signal via transformer $T_4$ to the gating electrode of SCR-F; and conduction of SCR-F now connects the previously charged capacitor 36 across SCR-D to turn off SCR-D and, accordingly, SCR-A as well.

Thus, by the sequence of operation described, SCR's A-D inclusive are turned on and off in pairs sequentially to effect current flow in alternately opposing directions through stator coil winding 15. By providing a similar arrangement for each of the plurality of different phase windings in the stator, and by energizing appropriate pairs of the SCR's in proper sequence (while shutting off, in proper sequence, the previously conducting pair of SCR's) the stator field can be caused to effectively rotate thereby to effect rotation of rotor R at a speed synchronized with the frequency of the inverter circuit.

The system of the present invention is applicable to dc motors which employ high voltages (e.g., much higher than that provided by source 16) where the use of a commutator is impractical or prohibitive. All that need be done is to provide several SCR's in series, in place of each of the single SCR's shown in FIG. 1.

The arrangement thus far described in reference to FIG. 1 depends for proper operation upon the turn-off function accomplished by capacitor 36 and its associated SCR's E and F. This type of turn off mechanism has the disadvantage that significant time delays may occur between the energization of one winding, the later turn off of that winding, and subsequent energization of a next winding, and the timing of the turn off operation also tends to be somewhat inaccurate. The present invention accordingly uses a different SCR turn off mechanism which has far greater accuracy, with the turn off of SCR's occurring so accurately that there is no appreciable time between the shutting off of one phase and the turning on of the next, i.e., the dc current feeding the motor through the SCR's is practically constant. As will appear hereinafter, the turn-off mechanism employing capacitor 36 and SCR E and F, and their associated transformers, etc., can be effectively disconnected from the inverter by opening switch 64.

Figure 4:
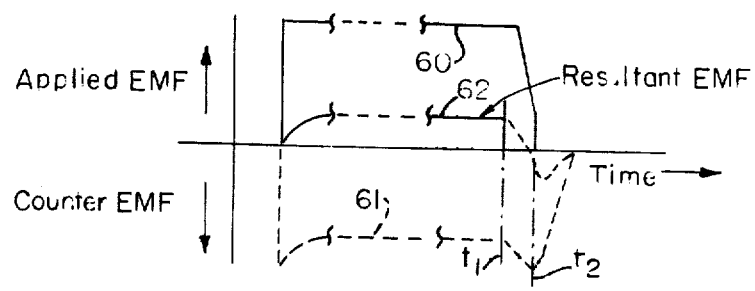
FIG. 4 is a graphical representation showing the variation of the applied and induced voltages during operation of the motor.

The simpler and more reliable method of SCR turn-off employed in the present invention is based upon principles which are depicted graphically in FIG. 4. As each rotor pole of the motor is pulled toward a stator pole, the magnetic field in that stator pole increases due to the addition of the field from the rotor pole. This increase is gradual as the rotor turns. Since the counter EMF in the stator coils is proportional to the rate of change of the magnetic field, a steadily increasing field generates a direct potential for the duration of the increase. These principles are diagrammatically illustrated in FIG. 4 where curve 60 represents the EMF applied to a stator coil, and curve 61 represents the counter EMF across that stator coil. The counter EMF is of opposing polarity to the applied EMF, and effectively reduces the potential across th stator coils to a low value such as is depicted by curve 62. This low value may be in the order of 1 volt, and the resultant low voltage across the stator coil results in the moderate current through the low resistance of that stator coil.

The resultant potential across the stator coil of a given phase remains at a substantially fixed low value, represented by the horizontal portion of curve 62, until the SCR's in the inverter associated with the next phase stator coil are energized to effect current flow through the said next phase coil. This event is depicted as having occurred at time $t_1$ in FIG. 4. Due to the particular stator coil configuration which is employed, the current flow through the coil of next phase produces a sudden increase in the magnetic field across the coil of first phase which functions to increase the counter EMF across the coil of first phase to the point where it becomes higher than the potential applied to said coil of first phase, and, as a result, the current through the stator coil of first phase reverses in direction. The reversal of current turns off the SCR's in series with the coil of first phase at time $t_2$ depicted in FIG. 4. By this mechanism, and due to the stator winding configuration which is employed, when a coil of given phase is energized the resultant flow through that coil includes a potential in the coil which had previously been energized, with the induced potential having a magnitude and polarity operative to turn off the SCR's which are connected to the previously energized coil. The turn off is accordingly accomplished automatically and with highly precise timing.

Figure 2:
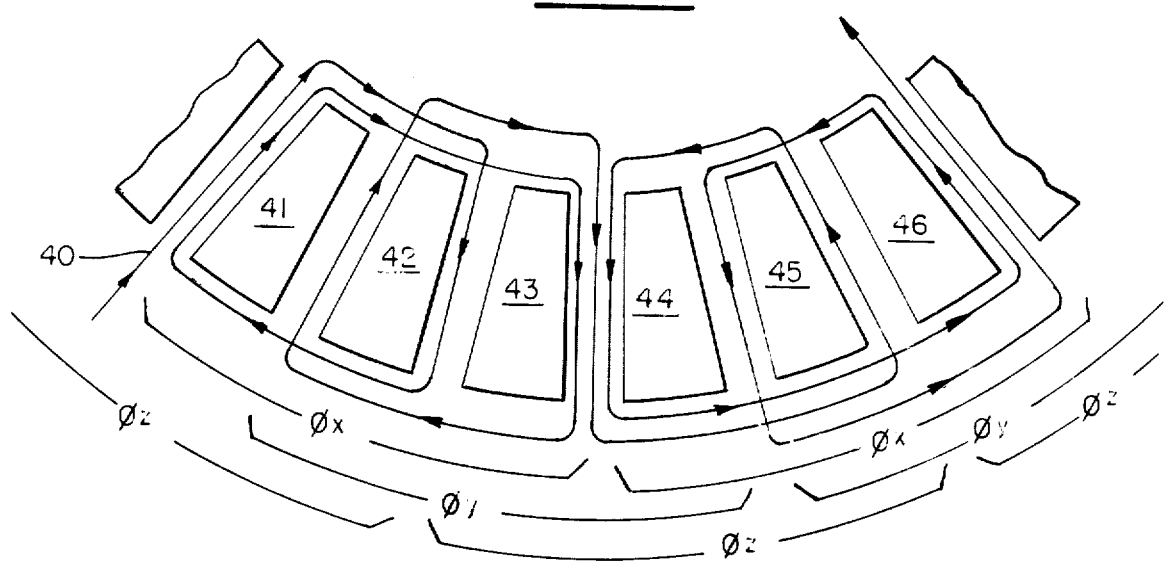
FIG. 2 illustrates the stator winding configuration employed in the motor of the present invention.

The stator coil configuration employed in the motor of the present invention, to achieve the operation described above, is illustrated in FIGS. 2 and 3. FIG. 2 is a plan view of the stator and diagrammatically illustrates one winding (designated $\phi x$) of the three phase winding employed. The $\phi x$ winding 40 is depicted as being associated with three stator segments 41, 42, 43 forming one pole of the stator for phase X, and with three further segments 44, 45, 46 forming the next adjacent opposing pole of phase X, it being understood that the winding continues in like configuration through successive adjacent sets of three stator segments each to form a circular array of phase X poles about the axis of the motor. The $\phi x$ winding 40 comprises, as illustrated in FIG. 2, a first coil which surrounds stator segments 41 and 42 and a second coil which surrounds stator segments 42 and 43 with the middle pole segment 42 sharing both coils; and winding 40 then continues in opposite direction but analogous configuration about the next three stator segments 44, 45, and 46 to form the opposite pole of phase X.

The complete winding array contains two additional windings for the second and third phases of the overall winding arrangement, but these two additional windings have not been drawn in full in FIG. 2 since they are not necessary to understand the principle and would complicate the figure. The position of the second winding has been depicted in FIG. 2, however, by the designation $\phi Y$, and the position of the third winding has been designated $\phi Z$. Each of the additional windings is the same as winding 40 except that it is displaced by one pole segment (in this case 15 geometric degrees) from its next adjacent winding, i.e., the $\phi Y$ winding is displaced 15° (or one segment) from the $\phi X$ winding, and the $\phi Z$ winding is similarly displaced 15° (or one segment) from the $\phi Y$ winding.

If we consider the three segments 41, 42 and 43 which comprise a single phase X stator pole, it will be seen that these three segments also share a portion of the windings associated with phase Y and phase Z, and the winding disposition of these three windings is asymmetrical with respect to the stator segments 41, 42 and 43. This asymmetry is an important feature of the present invention and will be more readily appreciated by reference to FIG. 3.

Figure 3:
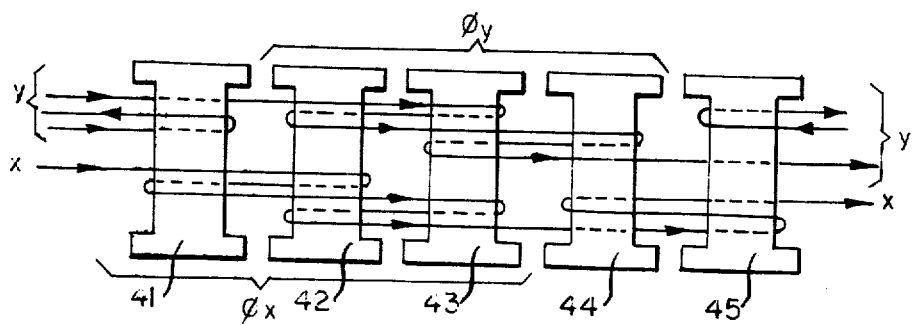
FIG. 3 shows in detail the relative location of two different phase windings on the stator, for purposes of explaining the induced voltage turn-off mechanism which characterizes the present invention.

FIG. 3 illustrates the aforementioned stator segments 41-45 from a different view and in association with two of the aforementioned windings $x$ and $y$ for the aforementioned phases X and Y respectively. The winding configuration corresponds to that described previously with reference to FIG. 2. Let us assume that coil $x$ is energized (i.e., the SCR's in the inverter associated with coil $x$ have been activated by appropriate rotation of commutator 17) and that a dc current is accordingly passing through winding $x$ in the direction of the arrowheads thereon to create a magnetic field of desired polarity. Let us now further assume that the time has arrived when it is desired to shut off the current flow through winding $x$, and to initiate current flow through winding y to shift the position of the stator magnetic field thereby to achieve a rotating magnetic field.

At this point in time, therefore, the SCR's associated with winding $y$ are energized by the steps already described in reference to FIG. 1, and a current commences flowing through winding $y$. The current flow through winding y is of such polarity as to rapidly increase the magnetic field through winding $x$; and this rapid increase in magnetic field generates a potential which opposes the current flow through winding $x$ by the mechanism already described in reference to FIG. 4. In other words the induced potential in winding $x$ adds to the counter EMF that already exists in said winding $x$ to cause a momentary reversal of current through winding $x$ operative to discontinue the conductivity of SCR's in series with winding $x$.

The foregoing operation will become more readily apparent from further consideration of FIG. 3. As shown in that figure, three segments 41–43 compose one pole formed by winding $x$. Parts of winding y are also present on segments 41–43. Current is caused to flow through winding y in the same direction as in $x$ on segments 42 and 43, but opposing in segment 41. Therefore, the magnetic field will tend to increase through the portions of winding $x$ on segments 42 and 43, and will tend to be reduced in segment 41. This causes an increase in the counter EMF across the portions of winding $x$ on segments 42 and 43, and a reduction in the counter EMF across the portion of winding x on segment 41. Due to the asymmetrical coil configuration employed, the increases in counter EMF are significantly greater than the reduction in counter EMF, whereby the resultant potential induced across the entire phase x winding exhibits an increase in counter EMF.

More particularly, it will be noted that on segment 42 the phase x winding has a double coil configuration, and the effect of an increased field will therefore generate twice the voltage across this portion of the winding x than it would if only a single coil were present. Similarly, while only a single loop of coil x appears on stator segment 43, the phase y winding has a double loop on segment 43; and current flow through winding y accordingly again produces the double voltage across the portion of winding x on segment 43. On segment 41, coils x and y each have a single winding, and current flows through them in opposite directions cancelling each other's effect on the counter EMF. The net effect of this winding disposition is therefore, to cause a considerable increase in the counter EMF across winding x due to initiation of current flow in winding y. The increase in counter EMF across coil x causes, as described previously, the current to reverse momentarily through coil x and, after about 70 microseconds of this reversed current flow, the SCR's in series with coil x are turned off to break the energization circuit to coil x.

Although the phase Z winding has not been shown in FIG. 3, it will be understood from the previous discussion that it too functions in the same way. When the phase Z winding is energized, current flow through that winding will induce a potential in the phase Y winding operative to turn off the SCR's. in series with the phase Y winding; and when, at a still later point in time, the SCR's in series with the phase X winding are activated, current flow through winding x will induce a potential in the phase Z winding operative to automatically break the energization circuit to the phase Z winding, etc. Thus the energization of each phase winding operates to shut off the SCR's in series with the previously energized phase winding, and this shut off occurs automatically and with such accuracy that no appreciable time exists between the shutting off of one phase and the turning on of the next. The dc current feeding the motor through the SCR's is nearly constant. The automatic turn-off which produces this result can be achieved, however, only when a coil configuration of the type shown in FIGS. 2 and 3 is employed. If two phase windings were used, with the winding of ore phase being located above and in the middle of the second phase, i.e., if the one phase is symmetrically located on both halves of the other phase, the above described distribution of induced potentials, with two thirds of the segments producing an increase in counter EMF and one third of the segments reducing the counter EMF, would not take place and there would be no net change in the counter EMF across either phase winding. The use of asymmetrically located coils of adjacent phases, in series with SCR's, is accordingly vital to proper operation of the invention.

Since the SCR's are automatically turned off by the counter EMF considerations described, it is no longer necessary to use the turn-off circuit previously described in reference to FIG. 1 (i.e., capacitor 36 and SCR's E and F) once the motor is started. The SCR turn off circuit shown in FIG. 1 can be employed during the starting operation, but once the motor has commenced rotation the SCR turn off circuit of FIG. 1 can be effectively disconnected from the inverter circuit by opening switch 64 (this can be done automatically by making switch 64 responsive to centrifugal forces) and the motor will continue to run in normal fashion.

The motor can also be started by a similar and somewhat less expensive method which permits capacitor 36 and SCR E and F (and their associated transformers, etc.) to be eliminated entirely. Inasmuch as the SCR cutoff operation described above usually will not operate until the motor has been started, a simple commutating switch 56 (See FIG. 1) can be provided in series with the power line to interrupt current flow to an energized phase winding at the proper time during the starting operation. In other words, when it is necessary to cut off the current momentarily at the proper sequence of operation after the motor has started to rotate, this cutoff operation can be handled by a mechanical switch of the type shown at 56 in FIG. 1 and, after the motor has started and the next phase becomes connected, the system of automatic cutoff resulting from induced potential, as described earlier, becomes operative.

The switch 56 as illustrated, includes a central conductive hub which is connected by means of a brush to one side of power source 16 (via rotor R) and includes a plurality of outer spaced conductive segments which are electrically connected to the hub, and which are in turn connected via an additional brush to the common cathode connection of SCR's C and D so long as the outer brush is in contact with one of the conductive segments; and when commutator switch 46 has turned to the point that the outer brush is opposite a gap between segments, the aforementioned connection will be broken to interrupt current flow through the energized one of SCR's C and D as the case may be. During the starting operation, therefore, commutator 56 will function to interrupt current flow to an energized one of the phase windings to permit the next subsequent phase to be properly energized so as to rotate the stator magnetic field. At any subsequent time the SCR cutoff will take place automatically and should preferably be so times as to occur at an instant before mechanical cutoff would occur at commutator 56. In this way, intense sparking will be eliminated at commutator 56 except for the first current cutoff. After that one or few sparks, any further sparking is avoided provided the motor rotates at least slowly. It has been found in one case that the minimum rotational speed, to avoid repeated sparking at commutator 56, is approximately 140 rpm.

Commutator 56 may be removed from the circuit by shorting it with switch 59 after the motor has started rotating (this can be effected automatically by causing switch 59 to be centrifugally responsive) and in this way the electrical resistance of the brushes associated with commutator 56 can be avoided. However in some cases it may be practical to keep commutating switch 56 operative to take care of any emergency where the SCR's in the inverters are not properly cut off when they should be. Inasmuch as any of the three phases may be operative at the start, there must be one brush on commutator switch 56 for each phase, with proper angular spacing between the said brushes. The commutating switch 56 shown in FIG. 1 has two segments, and would be used with a two pole motor. However any number of poles and a corresponding number of commutator segments for switch 56 can be used without altering the principle of the invention (for example, see the four-segment arrangement of FIG. 6).

It has also been found that the segmental pole arrangement previously described in reference to FIGS. 2 and 3, i.e., the arrangement wherein each pole was subdivided into a number of segments, improves the torque to weight ratio of the motor. It was also found advantageous to employ a larger number of poles that used conventionally, which permits a reduction in the length of the axial airgap motor employed. This improvement results from the fact that the end rotors in the axial airgap motor must have a ferrous ring backing to conduct the magnetic field between poles, and use of a larger number of poles means that fewer magnetic lines must be conducted from one pole to the other thereby permitting the cross section of the end ring to be reduced, and resulting in a saving in the weight and length of the motor. Unlike other synchronous motors, the rpm is not dependent on the number of poles employed since increased frequency compensates for the additional poles. The size of the poles may be reduced while the number of them may be increased by the use of the present invention, without causing a reduction in the rpm and horsepower. Due to the fact that a higher frequency can be used to compensate for the drop in speed, it is fairly important to use a motor which incorporates the considerations described in my U.S. Pat. No. 3,567,978. The reason for this is that the use of higher frequency increases the iron losses very rapidly, whereas the main feature of my said prior patent is a reduction of iron losses in the order of 10 to 1 over conventional AC motors. The reduction in iron losses is accomplished by the reduction in the quantity of iron in the AC field. If conventional synchronous motors with large numbers of poles were used in connection with the SCR inverter, there could well be a considerable increase in the heat generated as a result of the increased losses encountered, and this would place a low limit on the useful horsepower of the motor.

The use of a higher number of pole segments improves the torque to weight ratio for a different reason as well. It is necessary in this respect to consider the ratio of the magnetic attraction which occurs tangentially, to that which occurs axially. When two large surface poles face one another, there is a very large attraction axially between them even if they are angularly displaced; this is in addition to the tangential force between the two poles. This force is due, among other factors, to the fact that with stator poles having large surface areas, the magnetic field concentrates in that part of the pole which is opposite to the rotor of opposite polarity. As a result, some of the surface is insufficiently used, while some other part of the pole may actually be saturated. In contrast, when the pole configuration is of the smaller segmental type illustrated in FIGS. 2 and 3, wherein many small poles having the same size airgap as the large ones are provided, the resultant structure has a much larger tangential to axial force ratio.

The foregoing advantages are achieved simply by segmenting the pole structure in the stator. However it is possible to increase this advantage even further, with a resultant additional increase in the tangential to axial force ratio, by employing rotor pole pieces of segmental configuration wherein the number of rotor pole segments equals that of the number of stator pole segments. By this arrangement, each rotor pole segment will become a small pole, e.g., in an eight pole twenty four segment motor constructed in accordance with the present invention, each pole covered an angular width of 15°.

Figure 5:
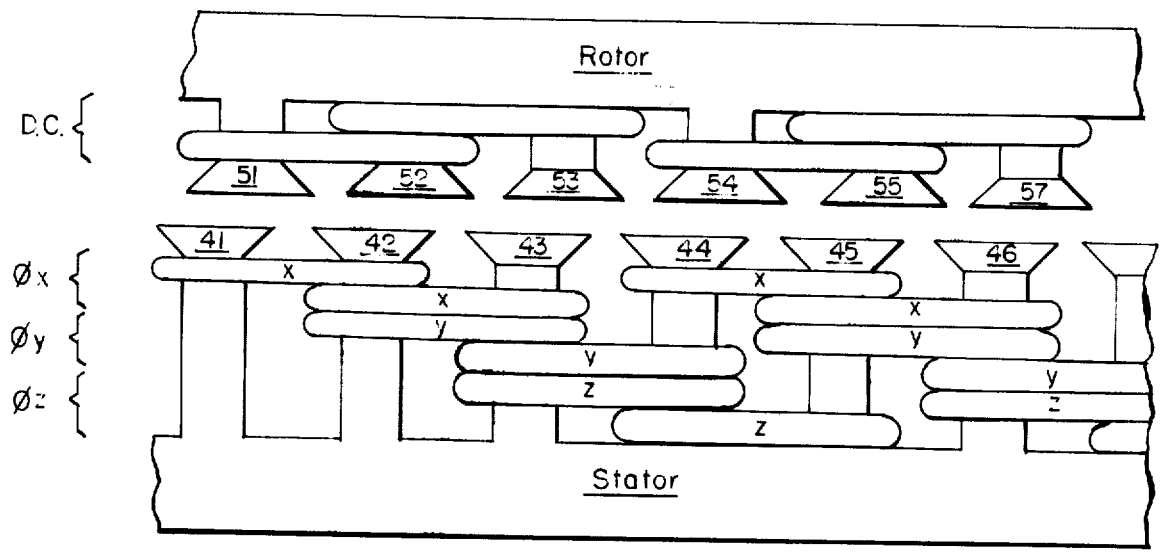
FIG. 5 illustrates the relative positions of the stator and rotor pole segments, and their associated windings, in a preferred embodiment of the present invention.

FIG. 5 illustrates a stator and rotor configuration constructed in accordance with this further embodiment of the invention, i.e., wherein the rotor and stator poles are both segmented.

It is to be noted that in the arrangement shown in FIG. 5 there are the same number of segments on both rotor and stator. While this is unconventional, one advantage is the sudden increase of the magnetic field when rotor and stator segments approach each other. This assists in shutting off the stator current as described above.

The stator in FIG. 5 is a side view of the stator previously described in reference to FIG. 2, but the segments have been shown in straight line to better illustrate the principles involved. Segments 41, 42 and 43 represent three segments of one pole on the stator connected to phase X, while segments 44, 45 and 46 represent the opposite pole of the same phase. The other two phases ($\phi Y$ and $\phi Z$) are handled in similar fashion except that they are displaced 15° from one another as shown. The various coils of the several different phases have been marked by the letters $x$, $y$, and $z$ for ease of understanding.

The rotor poles are similarly segmented and associated with a winding energized by direct current. Rotor pole segments 51, 52 and 53 represent one pole of the rotor when it is so energized, and the opposite rotor pole is composed of segments 54, 55 and 57.

In a motor built in the fashion illustrated in FIG. 5 and described above, the torque will tend to vary considerably as the rotor segments pass each stator segment. This may make use of the motor somewhat undesirable in some applications. If greater uniformity of torque is desired, the torque can be made substantially uniform by providing two motors which are mounted on the same shaft with a proper angular displacement between the pole segments of one motor and the other. However the motor operates extremely well as it is when used as a driving source for motor vehicle, and has been found to exhibit a much better average torque than conventional type constructions employed for that purpose heretofore.

The brushes associated with commutator 56 (i.e., the brushes actually shown in FIG. 1 as well as the additional brushes which would be provided on commutator 56 for the other phases) and the brushes associated with commutator 17 (as well as the additional brushes which would be provided for the other phases) are preferably all mounted on a common brush holder which is physically integrated to all of the brushes. By moving this brush holder, all of the brushes on both commutators can be moved through the same angle and in the same direction simultaneously. The direction of rotation of the motor can be reversed simply by rotating the brush holder a half pole width in either direction, i.e., through an angle of 22 ½° in an eight pole motor.

Figure 6:
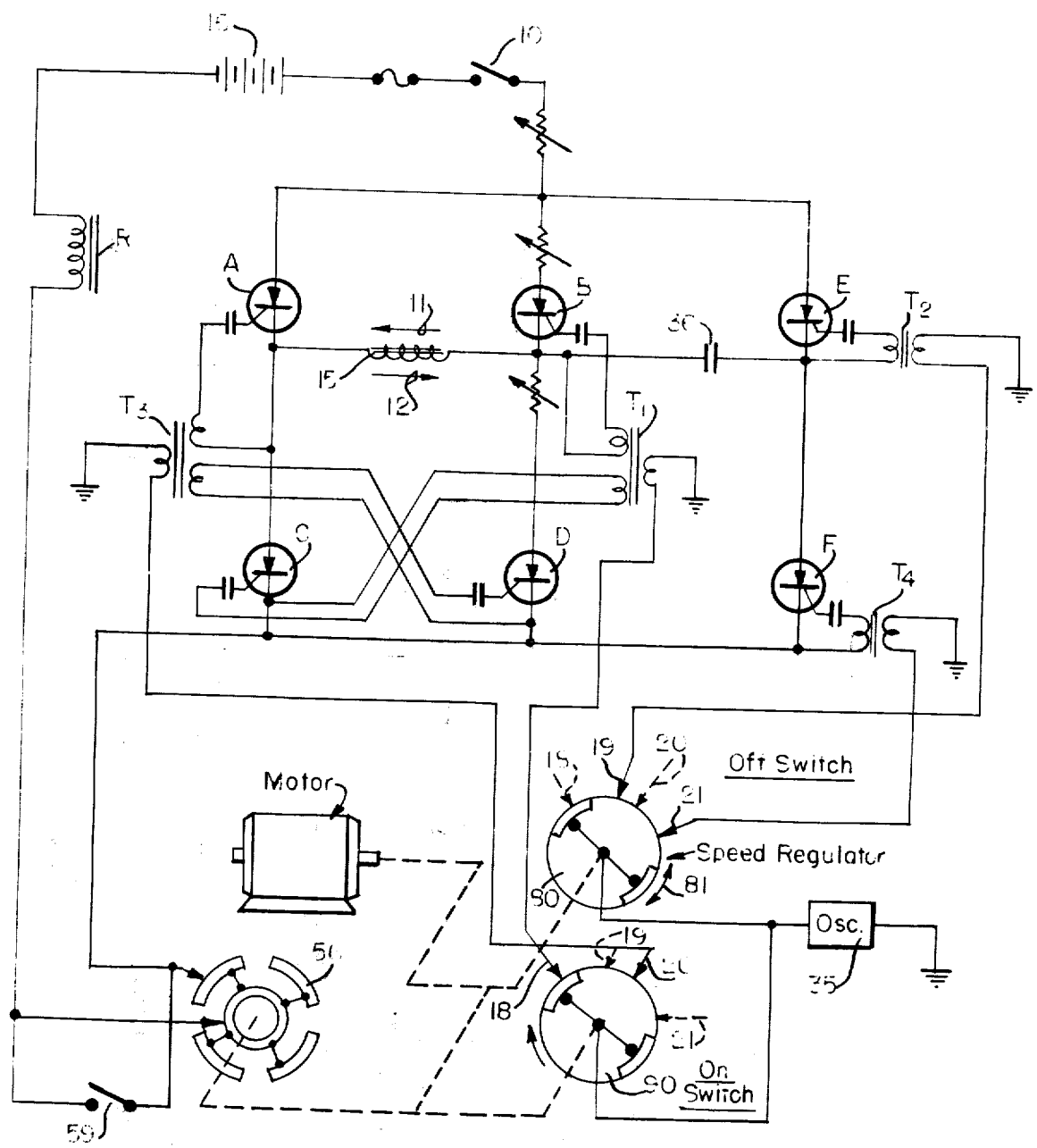
FIG. 6 illustrates a modification of the invention which incorporates a torque regulating system.

An alternative arrangement, which permits some of the brushes to be moved relative to others of the brushes on commutator 17, to provide a system for regulating the torque and/or speed of the motor, is illustrated in FIG. 6. FIG. 6 is, for the most part, identical to FIG. 1, and like numerals have accordingly been used to designate like parts. In the FIG. 6 arrangement, however, the commutator 17 of FIG. 1 has been modified to provide two commutator sections, designated 80 and 90 respectively, mounted to rotate together but so arranged that the angular positions of the brushes on the two sections can be varied relative to one another, e.g., manually. Commutator section 80 has the structural configuration previously described for commutator 17, but has only the "turn off" brushes 19 and 21 mounted thereon; and commutator section 90, which is also structurally the same as commutator 17 previously described, is associated only with the "turn on" brushes 18 and 20. By this arrangement, the time duration between the occurrence of a turn on pulse from one of the brushes 18 or 20, and the subsequent occurrence of a turn off pulse from a next operative brush 19 or 21, can be varied, thereby to vary the duration of time during which power is connected to the stator winding in question, simply by varying the angular position of the brush holder for the turn-off brushes 19, 21 (as designated by arrows 81) relative to the position of the brush holder which supports turn-on brushes 18 and 20.

The two commutator sections 80, 90 can comprise completely separate sections which are mounted to rotate together or, alternatively, can comprise spaced portions of a relatively wide commutator which accommodates both the on and off brushes in side by side relation to one another. Since the off brushes can be rotated (together with their brush holder) independently of the on brushes, it is possible to leave the normal "turn on" function provided by brushes 18 and 20 undisturbed, but to make the turn off function provided by brushes 19 and 21 to occur sooner than normal simply by rotating the turn off brush holder a few degrees in a direction opposite to the rotation of the commutator. If this is done, the turn off brushes 19 and 21 are reached, by the conducting segment of the commutator, at a time somewhat earlier than would occur in the fixed brush arrangement of FIG. 1, thereby resulting in the turn-off of one phase before it has time to exert its full effect. Of course all three phases of the machine would be treated in the same way, i.e., the turn off time of all phases would be equally advanced.

Inasmuch as the turn-off function is not intended to occur by the turning-on of the next phase, as in FIG. 1, it is necessary to use the turn-off method described previously in connection with the starting operation of the motor, i.e., the capacitor 36 must be connected across a conducting SCR when it is desired to discontinue its conduction. Turning off one phase by use of such a capacitor does not affect the operation of the other phases.

The arrangement of FIG. 6 has the important advantages of providing smooth, stepless control, and also provides high efficiency since power is not lost in a resistor.

While I have thus described preferred embodiments of the present invention, many variations will be suggested to those skilled in the art. It must therefore be understood that the foregoing description is intended to be illustrative only and not limitative of the present invention, and all such variations and modifications as are in accord with the principles described are meant to fall within the scope of the appended claims.

Having thus described my invention I claim:

1. A synchronous motor system comprising a motor having a rotor mounted for rotation on a motor shaft, said motor including a stator disposed adjacent said rotor and having a plurality of separate windings of different phases, a direct current power source, and an inverter between said source and said windings for energizing said different phases in sequence from said direct current source, said inverter comprising a plurality of silicon controlled rectifiers connected to said plurality of different phase windings respectively, cyclically operable means comprising a rotary commutator coupled to said motor shaft and driven thereby, said commutator including means for providing electrical pulses operative to activate different ones of said rectifiers in sequence during the running of said motor to effect current flow from said direct current source through different ones of said windings in sequence, said stator defining a plurality of poles for each phase each of which poles includes a plurality of adjacent stator segments, the segments defining each pole for a given phase carrying windings of different phases thereon disposed in asymmetrical relation to one another whereby, when current is flowing through a winding of given phase via a given activated rectifier, subsequent activation of a different one of said rectifiers produces a current flow through the winding of a different phase which current flow in said different phase in turn induces a potential having a magnitude and polarity operative to turn off the conducting silicon controlled rectifier connected to said winding of given phase.

2. The system of claim 1 including a further commutator driven by said motor shaft and disposed between said direct current source and each of said windings for interrupting the current flow through at least one of said windings at a predetermined time during the starting of said motor.

3. The system of claim 2 including switch means for shorting out said further commutator after said motor has been started.

4. The system of claim 3 wherein said switch means is centrifugally operable in response to said motor attaining a predetermined speed of rotation.

5. The system of claim 1 wherein said inverter includes an SCR turn-off circuit comprising a capacitor, means for charging said capacitor, and means for connecting said charged capacitor across a conducting silicon controlled rectifier in said inverter to turn off said rectifier, said SCR turn-off circuit being operative during starting of said motor, and switch means for disconnecting said SCR turn-off circuit after said motor has been started.

6. The system of claim 1 wherein said rotor defines a plurality of poles each of which comprises a plurality of adjacent, spaced rotor pole segments.

7. The system of claim 6 wherein said rotor has a plurality of rotor pole segments equal in number to said stator pole segments.

8. The system of claim 1 wherein said motor comprises an axial airgap motor.

9. The system of claim 8 wherein said motor comprises a pair of said rotors mounted as end rotors with said stator being disposed therebetween.

10. The system of claim 9 wherein a plurality of said stators are disposed in spaced relation to one another between said end rotors, and at least one further rotor disposed between said stators.

11. The system of claim 1 wherein said stator has separate windings of at least three different phases angularly displaced from one another on said stator pole segments.

12. The system of claim 11 wherein each stator pole of each phase comprises three adjacent pole segments, the winding of a given phase being disposed on its associated pole segments as a first coil wound in predetermined direction about first and second ones of said segments and as a second coil wound in said predetermined direction about second and third ones of said segments, the winding of said given phase then continuing in a similar winding disposition but in reverse direction about the next three adjacent pole segments to form a pole of opposite polarity for said phase, the windings of said three different phases being angularly displaced from one to the next of said phases by one stator pole segment respectively.

13. The system of claim 1 wherein said inverter includes at least two silicon controlled rectifiers connected in opposite conductivity directions respectively to each of said phase windings, said cyclically operable means being operative to activate different ones of said two rectifiers during different time periods respectively to effect current flow in opposing directions respectively through each of said windings during said different time periods.

14. The system of claim 13 wherein said inverter includes two pairs of silicon controlled rectifiers connected respectively to opposing ends of each of said windings, the rectifiers in each pair being poled in opposing conductivity directions relative to the associated end of said winding, said cyclically operable means being operative to activate a selected rectifier in each of said pairs of rectifiers thereby to control the direction of current flow through said winding.

15. The system of claim 14 wherein said cyclically operable means comprises means for applying energizing signals to the gate electrodes of different ones of said rectifiers in a predetermined sequence.

16. The system of claim 1 wherein said commutator has a movable arm driven by said motor shaft, an energization source connected to said arm, and a plurality of fixed contacts adapted to be engaged in sequence by said movable arm, said fixed contacts being coupled respectively to the gate electrodes of said silicon controlled rectifiers.

17. The system of claim 1 wherein said rotor includes a rotor winding, and means for energizing the winding of said rotor to effect a direct current flow therethrough.

18. The system of claim 17 wherein each pole of said rotor comprises a plurality of rotor pole segments having said winding thereon, the angular width of each rotor pole segment being substantially equal to the angular width of each stator pole segment and comprising a fraction of the angular width of each pole in said rotor and stator.

19. The system of claim 18 wherein the angular width of each rotor pole segment and of each stator pole segment is substantially 15°.

20. In combination, an electric motor having a rotor and at least one stator coil, a bridge-type current inverter connected to said motor, said inverter comprising first and second pairs of silicon controlled rectifiers connected to said stator coil of said motor, said first pair of rectifiers being poled in like direction to one another and in opposite direction to said second pair of rectifiers relative to said stator coil whereby conduction of said first pair of rectifiers effects current flow via said first pair in a first direction through said stator coil and conduction of said second pair of rectifiers effects current flow via said second pair in the opposite direction through said stator coil, said reversals in stator coil current flow direction cooperating with said rotor to produce a torque between said stator coil and rotor operative to effect rotary movement of said rotor, first control means coupled to each of the rectifiers in said first and second pairs of rectifiers for rendering alternate ones of said pairs of rectifiers conductive during alternate mutually exclusive periods of time for shutting off the conducting pair of said rectifiers, and regulating means for selectively varying the time of operation of said second control means relative to the time of operation of said first control means to control the time duration during which current flows through said stator coil thereby to control the torque of said motor, said first and second control means comprising at least one rotary commutator connected to the rotor of said motor and driven thereby, said first control means comprising a first plurality of brushes on said commutator, said second control means comprising a second plurality of brushes on said commutator, said first and second pluralities of brushes being energized at a rate and in a sequence determined by the rotation of said motor rotor and at relative times determined by the positions of said brushes relative to one another, said regulating means comprising means for shifting the positions of said first and second pluralities of brushes relative to one another, said second control means including a capacitor and selectively operable switch means for connecting said capacitor across one of the rectifiers in the conducting pair of said rectifiers, said brushes being coupled to said switch means and to the gate electrodes of each of the rectifiers in said first and second pairs of rectifiers to control the operating states of said switch means and rectifiers in a sequence and timed relation determined by the positions of said brushes relative to one another.

21. The combination of claim 20 wherein the brushes comprising said first plurality of brushes are mounted in fixedly spaced relation to one another in a first brush holder, the brushes comprising said second plurality of brushes being mounted in fixedly spaced relation to one another in a second brush holder, said regulating means being operative to shift the positions of said first and second brush holders relative to one another.

22. The combination of claim 21 wherein said first and second brush holders are mounted adjacent first and second rotary commutators respectively.

23. The combination of claim 21 wherein said first and second brush holders are mounted in side-by-side relation to one another adjacent a single rotary commutator.

* * * * *